United States Patent Office 3,037,023
Patented May 29, 1962

3,037,023
PROCESS FOR PREPARATION OF PIPERAZINE
Philip H. Moss and Norman Bell Godfrey, Austin, Tex., assignors to Jefferson Chemical Company, Inc., Houston, Tex., a corporation of Delaware
No Drawing. Filed June 3, 1957, Ser. No. 662,998
6 Claims. (Cl. 260—268)

This invention relates to the preparation of piperazine and, more particularly, to an improved process for reacting an ethanolamine to produce piperazine.

This application is a continuation in part of our application Serial No. 612,040, filed on September 25, 1956, now abandoned.

In its broadest scope, the process of this invention comprises heating an ethanolamine in the presence of ammonia, hydrogen and a hydrogenation catalyst. The term ethanolamine is used in the generic sense and is meant to include monoethanolamine, diethanolamine, triethanolamine, and mixtures thereof with one another, such as the crude mixture resulting from treating ethylene oxide with aqueous ammonia.

Minor amounts of piperazine derivatives have been produced as by-products of the reaction of isopropanolamine with ammonia in the presence of hydrogen and a hydrogenation catalyst to produce 1,2-propane diamine as the main product in about 65% of theory, some unreacted starting material, and a minor amount of dimethylpiperazine as a by-product. This reaction is shown by Fowler, U.S. 2,519,560. It has now been discovered, in contrast to the Fowler teaching, that certain alkanolamines do not follow the above reaction. Thus, it has been discovered that ethanolamines, when reacted in the presence of ammonia, hydrogen and a hydrogenation catalyst will produce piperazine as the major product while only minor amounts of diamine are produced. It has also been discovered that when water is added to the reaction mixture comprising an ethanolamine, ammonia and hydrogen, a further unexpected improvement in the yield of piperazine is obtained.

In accordance with this invention, an ethanolamine is heated in the presence of substantial amounts of ammonia, hydrogen and a hydrogenation catalyst to produce piperazine. The process is generally conducted in the liquid phase at an elevated temperature and pressure. The temperature and pressure are not critical. The reaction temperature may be between about 150° C. and about 400° C. although it has been found preferable to conduct the reaction between about 200° C.–300° C. Desirably, this process is conducted under relatively high pressures ranging from about 30 to about 400 atmospheres with the preferred pressure range between 65 to 225 atmospheres.

The presence of ammonia is essential for the efficient operation of this process. Thus, while ammonia is not required to satisfy the chemical balance of the reaction starting with monoethanolamine, nevertheless, its presence has been observed to sharply increase the yield of the piperazine product. This is shown by the results of tests summarized in Table I. In these tests, monoethanolamine (identified as MEA) was reacted under the same conditions of temperature and pressure except that the amount of ammonia was varied.

TABLE I

| Mols $NH_3$/MEA | Conversion, percent of MEA charged | Piperazine Yield mol percent based on MEA reacted |
|---|---|---|
| 0 | 91 | 15 |
| 3.0 | 76 | 35 |
| 5.0 | 79 | 38 |

When diethanolamine, triethanolamine or a mixture of crude ethanolamines are reacted, one mol of ammonia must be available for chemical combination for each mol of diethanolamine or triethanolamine present in the reactants. Aside from this chemical requirement, ammonia must be present in an amount substantially in excess of the molar requirements in order to realize the benefits of this process. Optimum yields of piperazine will be obtained when the molar ratio of ammonia to ethanolamine is at least about 2:1 and preferably greater than 3:1.

The presence of hydrogen is also critical if the process is to be efficiently conducted and it is necessary that the hydrogen partial pressure amount to a substantial part of the total pressure of the reaction atmosphere. Thus, hydrogen should constitute at least 10 and preferably between 20 to 200 atmospheres of the total pressure in the system. When hydrogen is to be introduced into the reaction vessel in a batch operation, it is a preferred practice to sweep the vessel clean with a portion of hydrogen gas and, thereafter, to introduce a predetermined amount of hydrogen into the sealed vessel. When the vessel is subsequently heated to bring it up to reaction temperatures, the hydrogen and other reactants contained therein will bring the total operating pressure within the range necessary for the reaction to proceed.

A number of hydrogenation catalysts may be employed in this process. The preferred catalysts consist essentially of one or more substances selected from the group consisting of the metals copper, nickel, and cobalt, and their oxides. A mixed metal oxide catalyst of this type may conveniently be prepared by ignition of mixtures of the corresponding metal nitrate or carbonate salts.

When oxides of copper, nickel and cobalt are introduced as the catalyst, the oxides are reduced to metal or lower oxides by the hydrogen present in the reaction. Alternatively, however, these oxides may be prereduced by passing a stream of hydrogen over the oxides while heating them to 200–400° C., thereafter being brought into contact with the reactants.

The preferred catalysts may be employed with or without minor amounts of at least one normally non-reducible metal oxide from the group consisting of chromium oxide, molybdenum oxide, manganese oxide, and thorium oxide. These non-reducible oxides promote the activity of the preferred catalyst and, accordingly, are conveniently referred to as promoters.

Specific preferred catalyst compositions consist of 75% NiO, 22% CuO and 3% $Cr_2O_3$ (as a promoter), as well as the corresponding catalyst obtained by prereducing this oxide composition with hydrogen to form metallic nickel and copper along with chromium oxide.

The catalyst may be carried on an inert support, such as silica, Filtros, and alumina but is suitable either with or without a support, for use in a batch process or in a fixed bed continuous flow process. In a batch process, the amount of catalyst employed generally will be between about 5% to 20% by weight of the ethanolamine.

During the development of this process, it was unexpectedly discovered that the addition of water very markedly increased the yields of piperazine over the same reaction conducted in the absence of added water. When water was added to the reactants, the yield of piperazine increased in the order of 10% or more. Thus, the yield of piperazine typically increased from about 35% to about 45%. Example III below illustrates such increases. At least about 15% by weight of water based on the weight of the reactants in the system should be added to obtain the full benefit of this improvement. While the upper limit on the amount of water to be added is not critical, it has been found that no appreciable additional advantage is obtained when the water exceeds about 75% by weight of the weight of the reactants.

*Example I*

1200 ml. of nickel chromite catalyst were placed in a hydrogenation unit and prereduced by passing hydrogen over the catalyst. Thereafter, ammonia and monoethanolamine, in the mol ratio of 5:1, were passed through the catalyst at a rate of 3.47 grams per ml. of catalyst per hour while hydrogen was introduced into the reaction zone at 13.4 standard cubic feet per hour (s.c.f.h.). The reaction zone was maintained at 235° C. under a pressure of 2900 pounds per square inch (p.s.i.g.). The nickel chromite catalyst employed had a bulk density of 1.12 g./ml. The weight ratio of ethanolamine passed per hour through the fixed bed of catalyst to the weight of catalyst was 1.28, and the average time of contact of the ethanolamine with the fixed bed calculates to about 4.4 minutes.

Distillation of the ammonia-free product gave 14.4% water, 11.7% ethylene diamine, 16.8% piperazine, 43.9% unreacted monoethanolamine and 13.2% residue, all the amounts by weight. 56% of the monoethanolamine introduced into the reaction was converted yielding 42.8 mol per cent piperazine and 21.4 mol percent ethylene diamine. The piperazine distilled at 147° C. and analyzed 99.3% pure.

*Example II*

122 grams of monoethanolamine, 18 grams of water, 10 grams of a nickel-copper-chromium oxide catalyst, and 170 grams of ammonia were charged into a stainless steel autoclave. Hydrogen was charged into this vessel to a pressure of 500 p.s.i.g. The vessel was agitated and heated at 242–243° C. for one hour. 85% of the charged monoethanolamine reacted yielding 35 mol percent piperazine and 21 mol percent ethylenediamine, based on reacted monoethanolamine.

*Example III*

The following reactions were carried out employing 122 grams of monoethanolamine and 10 grams of a nickel-copper-chromium oxide catalyst using a procedure similar to that outlined in Example II above. The effect of water for sharply increasing the yield of piperazine is illustrated.

TABLE II

| Reaction Conditions | A | B | C | D |
|---|---|---|---|---|
| Ammonia, g | 170 | 170 | 102 | 102 |
| Water, g | 100 | 0 | 200 | 0 |
| Average temperature, °C | 238 | 242 | 240 | 240 |
| Reaction time, min | 125 | 102 | 60 | 60 |
| Conversion of monoethanolamine, percent | 80 | 79 | 97 | 97 |
| Yield of piperazine based on the amount of converted monoethanolamine, percent | 42 | 32 | 50 | 40 |
| Yield of ethylenediamine based on the amount of converted monoethanolamine, percent | 20 | 22 | 8 | 8 |

*Example IV*

149 grams of triethanolamine (1 mol), 15 grams of a nickel-copper-chromium oxide catalyst and 153 (9 mols) grams of ammonia were charged into a stainless steel autoclave. The autoclave was flushed with hydrogen and then pressured to 350 p.s.i.g. with hydrogen. The autoclave was then heated to 240° C. and maintained at this temperature for 2.3 hours. A pressure of 2500 p.s.i.g. was attained during the reaction. After the removal of water and ammonia, 21.2 grams or 0.247 mol of piperazine were separated by distillation, boiling at about 56° C. under a pressure of 9 mm. of mercury. This yield is 24.7% of the theory.

*Example V*

PIPERAZINE FROM DIETHANOLAMINE

A stainless steel autoclave of 450 ml. capacity was charged with 105 grams of diethanolamine (1 mol) and 10 grams of copper-nickel-chromium oxide catalyst previously prepared by reduction of the mixed oxides with hydrogen. The vessel was sealed, purged with hydrogen, and 68.9 grams (4 mols) of anhydrous ammonia introduced under pressure. Hydrogen was then admitted until the pressure observed reached 750 p.s.i.g. The vessel was heated to 240° C. for 90 minutes while agitating. The product obtained after cooling and discharging the vessel was distilled with recovery of 11% of the diethanolamine charged and a yield of piperazine obtained amounting to 28 grams or 37% of theory.

*Example VI*

PIPERAZINE FROM MIXED ETHANOLAMINES 92 grams of monoethanolamine, 18.5 grams of diethanolamine, 7 grams of triethanolamine, and 100 grams of water were weighed into a stainless steel autoclave vessel of 1.4 liters capacity, followed by 20 grams of a nickel-copper-chromium oxide catalyst previously reduced. The vessel was closed and purged with hydrogen, and 170 grams of ammonia were introduced, followed by hydrogen to a total pressure of 500 p.s.i.g. The vessel was heated at 227°–245° C. for an hour and three quarters while undergoing agitation. On separation of the products, it was found that a 34% yield of piperazine and an 11% yield of ethylenediamine had been obtained.

*Example VII*

122 grams of monoethanolamine and 10 grams of a previously reduced commercial nickel-copper-manganese oxide catalyst supported on silica gel were charged to a stainless steel autoclave vessel of 1.0 liter capacity. The vessel was closed and purged with hydrogen, and 68 grams of ammonia were introduced, followed by hydrogen to a total pressure of 500 p.s.i.g. The vessel was heated at 240° C. for two hours while undergoing agitation. On separation of the products it was found that 84% of the monoethanolamine had reacted and that a 17.9% yield of piperazine and a 2.4% yield of ethylenediamine had been obtained.

*Example VIII*

122 grams of monoethanolamine and 10 grams of a previously reduced copper chromite catalyst containing 84% CuO and 15% $Cr_2O_3$ were charged to a stainless steel autoclave vessel of 1 liter capacity. The vessel was closed and purged with hydrogen, and 68 grams of ammonia were introduced, followed by hydrogen to a total pressure of 500 p.s.i.g. The vessel was heated at 215–222° C. for one hour while undergoing agitation. On separation of the products it was found that 47% of the monoethanolamine had reacted and that a 19% yield of piperazine and an 8% yield of ethylenediamine had been obtained.

It will be understood that piperazine may also be prepared according to this process by employing starting materials known to form an ethanolamine followed by conversion of such ethanolamine according to the procedure set forth hereinabove. Furthermore, this alternate procedure may be conducted in essentially one step. Thus, ethylene oxide and ammonia may be condensed in a reaction zone designed for effecting the formation of piperazine and thereupon be converted to piperazine. The following example illustrates this modification of the invention.

*Example IX*

An autoclave-type reactor was employed for the reaction. 100 grams of water and 10 grams of a reduced nickel-copper-chromium oxide catalyst were charged into the reactor after which the reactor was purged with hydrogen. 255 grams of liquid ammonia were pressured into the reactor followed by the addition of 44 grams of ethylene oxide. Heat was applied to the reactor and at 75° C. hydrogen added to bring the total pressure to 1100 p.s.i.g. The reactor was agitated and the contents maintained at a reaction temperature of 240° C. for a two hour period. The reaction pressure varied from 3600 to 3800 p.s.i.g. On completion of the reaction, the reactor was cooled and the product separated by distillation. 15% of the ethylene oxide had been converted to piperazine and 25% of the ethylene oxide converted to monoethanolamine.

Obviously, many modifications and variations of the invention, as hereinbefore set forth, may be made without departing from the spirit and scope thereof, and therefore only such limitations should be imposed as are indicated in the appended claims.

We claim:

1. A method for the preparation of piperazine which comprises reacting an ethanolamine selected from the group consisting of monoethanolamine, diethanolamine, triethanolamine, and mixtures thereof, with a molar excess of ammonia of at least about 2 to 1 at a temperature within the range of about 150° to about 400° C. under a pressure within the range of about 30 to about 400 atmospheres in the presence of at least 10 atmospheres partial pressure of hydrogen and a solid hydrogenation catalyst, whereby piperazine is formed as a significant reaction product and recovering piperazine from the other components of said reaction product, said catalyst comprising a catalytically active metalliferous member selected from the group consisting of metals and oxides of nickel, copper, cobalt and mixtures thereof.

2. A method for the preparation of piperazine which comprises reacting an ethanolamine selected from the group consisting of monoethanolamine, diethanolamine, triethanolamine, and mixtures thereof, with a molar excess of ammonia of at least about 3 to 1 at a temperature within the range of about 200° to about 300° C. under a pressure within the range of about 65 to 225 atmospheres in the presence of hydrogen and a solid hydrogenation catalyst, whereby piperazine is formed as a significant reaction product and recovering piperazine from the other components of said reaction product, said catalyst comprising a catalytically active metalliferous component consisting essentially of a major amount of a first member selected from the group consisting of metals and oxides of nickel, copper and cobalt, and mixtures thereof, and a minor amount of a non-reducible metal oxide secondary member selected from the group consisting of chromium oxide, molybdenum oxide, manganese oxide and thorium oxide, the partial pressure of said hydrogen being within the range of about 20 to about 200 atmospheres.

3. A method as in claim 2 wherein said reaction is conducted in the presence of from about 15% to about 75% of water, based on the weight of the reactants.

4. A method as in claim 2 wherein the ethanolamine is monoethanolamine.

5. A method as in claim 2 wherein the ethanolamine is diethanolamine.

6. A method as in claim 2 wherein the ethanolamine is triethanolamine.

References Cited in the file of this patent

UNITED STATES PATENTS

| | | |
|---|---|---|
| 2,186,392 | Reynhart | Jan. 9, 1940 |
| 2,519,560 | Fowler | Aug. 22, 1950 |
| 2,525,223 | Howard | Oct. 10, 1950 |
| 2,622,073 | Ferrero et al. | Dec. 16, 1952 |
| 2,754,330 | Shreyer | July 10, 1956 |
| 2,823,236 | Lowe et al. | Feb. 11, 1958 |
| 2,861,994 | Cocker et al. | Nov. 25, 1958 |
| 2,861,995 | MacKenzie | Nov. 25, 1958 |
| 2,911,407 | Langdon et al. | Nov. 3, 1959 |

OTHER REFERENCES

Fieser et al.: Organic Chemistry, 2nd ed. (1950), pages 66–68, 83, 107–108, 179, 227.